(12) United States Patent
Chaudhry et al.

(10) Patent No.: US 7,346,866 B2
(45) Date of Patent: Mar. 18, 2008

(54) METHOD AND APPARATUS TO GENERATE CIRCUIT ENERGY MODELS WITH CLOCK GATING

(75) Inventors: Rajat Chaudhry, Austin, TX (US); James Scott Neely, Wappingers Falls, NY (US); Daniel Lawrence Stasiak, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 93 days.

(21) Appl. No.: 11/044,597

(22) Filed: Jan. 27, 2005

(65) Prior Publication Data
US 2006/0190856 A1 Aug. 24, 2006

(51) Int. Cl.
*G06F 17/50* (2006.01)
(52) U.S. Cl. .............................................. 716/4; 716/1
(58) Field of Classification Search .................... 716/1, 716/4
See application file for complete search history.

(56) References Cited

U.S. PATENT DOCUMENTS

| | | | |
|---|---|---|---|
| 5,227,672 A | | 7/1993 | Sawtell |
| 6,212,665 B1 * | | 4/2001 | Zarkesh et al. ................ 716/4 |
| 6,345,379 B1 * | | 2/2002 | Khouja et al. ................. 716/4 |
| 6,397,170 B1 * | | 5/2002 | Dean et al. .................... 703/14 |
| 6,810,482 B1 * | | 10/2004 | Saxena et al. ............... 713/320 |
| 7,051,300 B1 * | | 5/2006 | Shen et al. ..................... 716/4 |
| 2002/0171483 A1 | | 11/2002 | Shinjo et al. |
| 2003/0085732 A1 | | 5/2003 | Hernandez-Marti |
| 2004/0019859 A1 * | | 1/2004 | Ravi et al. ..................... 716/4 |
| 2004/0239189 A1 | | 12/2004 | Sundstrom |
| 2005/0030268 A1 | | 2/2005 | Zhang et al. |
| 2005/0050481 A1 * | | 3/2005 | Keller et al. ................... 716/4 |
| 2005/0050495 A1 * | | 3/2005 | McGuffin et al. .............. 716/5 |
| 2005/0091427 A1 | | 4/2005 | Yoshida et al. |
| 2005/0102643 A1 | | 5/2005 | Hou et al. |
| 2005/0159907 A1 | | 7/2005 | Chaudhry et al. |
| 2006/0031795 A1 * | | 2/2006 | Rahmat et al. ................ 716/5 |
| 2006/0080076 A1 * | | 4/2006 | Lahiri et al. ................. 703/18 |
| 2006/0168490 A1 | | 7/2006 | McCormack et al. |

* cited by examiner

*Primary Examiner*—Jack Chiang
*Assistant Examiner*—Magid Y. Dimyan
(74) *Attorney, Agent, or Firm*—Carr LLP; D'Ann N. Rifai (57) ABSTRACT

A method, a computer program, and an apparatus are provided for generating circuit energy models for a macro using clock gating inputs. Circuit energy models are used to estimate system power consumption. The present invention enables circuit energy models to be created for macros that contain clock gating inputs. Power tables are created based upon the macro's input switching factor percentage and the clock activation percentage. These power tables are generated from a minimum number of power simulations. By using clock activation percentage as a parameter accurate energy tables are produced.

12 Claims, 7 Drawing Sheets

| POWER | SWITCHING FACTOR % | | | | | |
|---|---|---|---|---|---|---|
| | 0 | 10 | 20 | 30 | 40 | 50 |
| | <u>0</u> | .1 | .2 | .3 | .4 | <u>.5</u> |

UNDERLINED VALUES FROM SIMULATION
BLACK VALUES LINEAR ESTIMATES

| | SWITCHING FACTOR % | | | | | |
|---|---|---|---|---|---|---|
| | 0 | 10 | 20 | 30 | 40 | 50 |
| 0 | <u>0</u> | .1 | .2 | .3 | .4 | <u>.5</u> |
| 20 | .1 | .2 | .3 | .4 | .5 | .6 |
| 40 | .2 | .3 | .4 | .5 | .6 | .7 |
| 60 | .3 | .4 | .5 | .6 | .7 | .8 |
| 80 | .4 | .5 | .6 | .7 | .8 | .9 |
| 100 | <u>.5</u> | .6 | .7 | .8 | .9 | <u>1.0</u> |

CLOCK ACTIVE %

UNDERLINED VALUES FROM SIMULATION
BLACK VALUES LINEAR ESTIMATES

FIG. 7

METHOD AND APPARATUS TO GENERATE CIRCUIT ENERGY MODELS WITH CLOCK GATING

FIELD OF THE INVENTION

The present invention relates generally to power estimation in chip design, and more particularly, to generating an energy table based upon input switching factor percentage and clock activation percentage.

DESCRIPTION OF THE RELATED ART

System power consumption is an important issue in Very Large-Scale Integration (VLSI) chip design. Battery life, packaging cost, and power delivery cost are factors that are affected by chip power consumption. Power estimates are used in place of methodical testing or methodical simulation to save time and resources. These estimates can be extrapolated from a minimal number of simulations or tests. To lower the power consumption of a particular chip design it is important that the power estimates are accurate.

Figure 1:
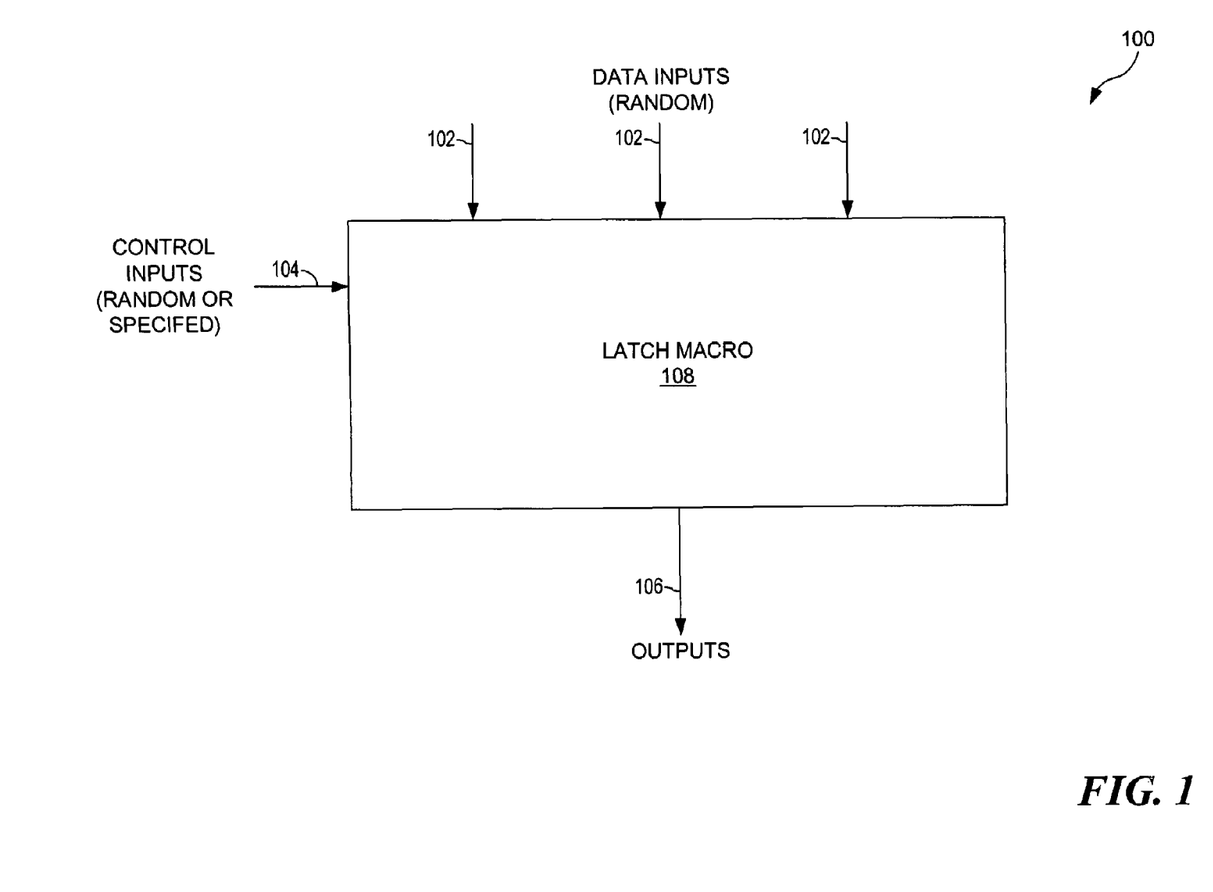
FIG. 1 is a block diagram depicting a macro that receives inputs and generates signal outputs.

Chip power estimation starts at the macro level. A chip is made up of many macros, which are small circuits within the chip. Each macro within a chip generates an energy model or rule. Referring to FIG. 1 of the drawings, reference numeral 100 generally designates a block diagram depicting a macro that receives inputs and generates signal outputs. The latch macro 108 receives data inputs 102 and control inputs 104. The data inputs 102 are random and depend upon other circuits and signals within the system. The control inputs 104 are random or specified, which means that they can depend upon other circuits and signals within the system, or they can be controlled to produce desired signal outputs. The latch macro 108 produces the signal outputs 106 in response to the data inputs 102 and the control inputs 104.

Figure 2:
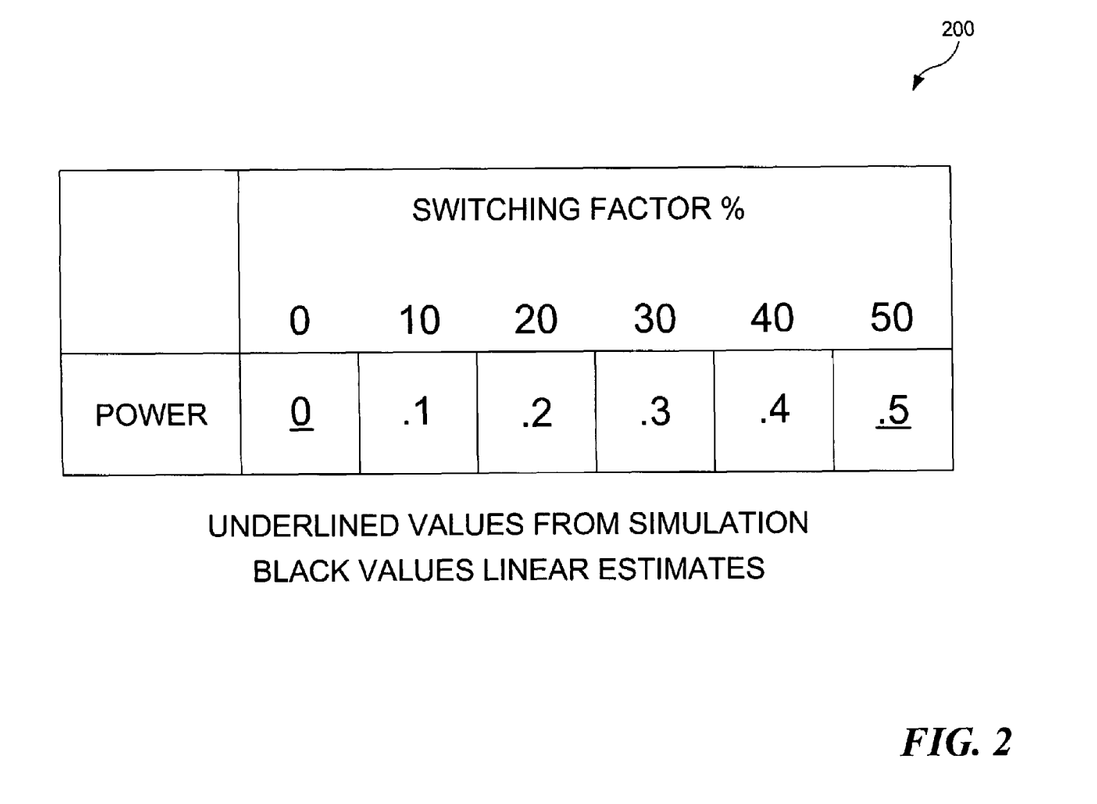
FIG. 2 is a hypothetical power table that estimates the power consumption of a macro based upon the input switching factor percentage.

Referring to FIG. 2 of the drawings, reference numeral 200 generally designates a hypothetical power table that estimates the power consumption of a macro based upon the input switching factor percentage. The switching factor refers to the data inputs 102 and how often they switch from low to high. Therefore, a 50% switching factor would indicate that the data inputs 102 change state every other cycle. The switching factor percentages in this table run from 0% to 50%. Simulations were done to accurately estimate the power consumption of this macro at a 0% switching factor and at a 50% switching factor. The rest of the values in the table are linear estimates based upon the simulation results. Based upon these values, the power consumption of this specific macro at any of the listed switching factors can be accurately estimated. Furthermore, if the power consumption of the macros within a chip can be estimated, then the power consumption of the whole chip can be estimated.

SUMMARY OF THE INVENTION

The present invention provides a method, a computer program, and an apparatus for generating circuit energy models for a macro using clock gating inputs. Accurate circuit energy models are important for estimating the power consumption of a specific chip. The estimation process begins by estimating the power consumption of macros within the chip, which ultimately leads to a power estimation of the whole chip. This invention provides a means to produce energy models based upon two parameters: input switching factor percentage and clock activation percentage.

To produce these energy models the specific macro must be accurately represented in a computer program. From this model macro power simulations can be generated for any combination of input switching factor percentages and clock activation percentages. With clock gating inputs the clock activation percentage can be estimated by turning on and off the clock gating to represent the desired percentage. After a small amount of power simulations are generated the rest of the values in the power table are produced in a linear fashion. The resulting power table contains accurate power estimations of a macro for a wide variety of input switching factor percentages and clock activation percentages.

BRIEF DESCRIPTION OF THE DRAWINGS

For a more complete understanding of the present invention and the advantages thereof, reference is now made to the following descriptions taken in conjunction with the accompanying drawings, in which:

FIG. 5 is a block diagram illustrating a macro with clock gating on;

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in block diagram or flow chart form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

The power simulations of these macros are carried out by computer software programs. Typically, one computer program sets up the circuits and the inputs into the circuits and another computer program carries out the simulation. The former computer program can be described as a design methodology and tool set for detailed analysis of power, as well as on-chip noise and reliability of the network. For one example, a Common Power Analysis Methodology for microprocessors (CPAM) program allows a user to set up a specific macro, including accurate input states that can be utilized for macro power simulations. The other computer program is used to provide quick, accurate power simulations. As one example, ACES is a fast circuit simulator program that allows a user to accomplish timing simulations, static timing analysis, noise analysis, and power analysis. In combination these computer programs provide accurate power simulations.

Referring to FIG. 2, programs like CPAM and ACES provide the simulated power estimates that are required to make the power table. These power estimates are created by setting up the circuit and the correct input states through CPAM. Then an ACES simulation is used to produce the power estimates. Signals are held high, low or switched high and low in a particular sequence or randomly. Based upon the input pins switching factor CPAM generates a table of the power estimates for the circuit. As shown in FIG. 2, CPAM generates an estimate at 0% switching factor and an estimate at 50% switching factor and then generates the rest of the values in a linear fashion.

Figure 3:
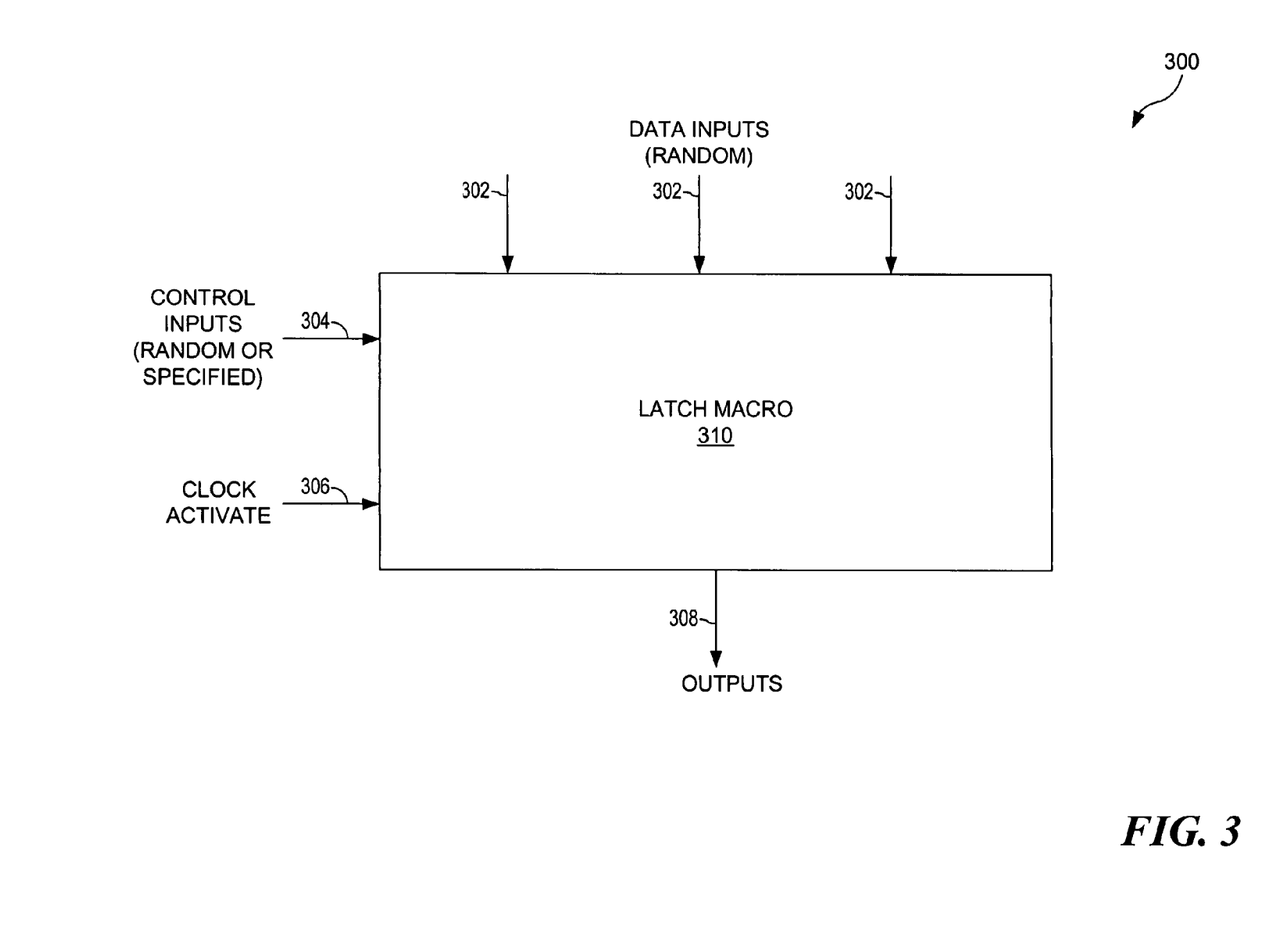
FIG. 3 is a block diagram depicting a macro that receives signal inputs, a clock signal, and a clock activate signal, and generates signal outputs.

Referring to FIG. 3 of the drawings, reference numeral 300 generally designates a block diagram depicting a macro that receives signal inputs, a clock signal, and a clock activate signal, and generates signal outputs. The conventional methods for producing a power table were unable to estimate the power of a macro that received a clock activate signal along with the control inputs. The latch macro 310 receives data inputs 302, control inputs 304, and a clock activate signal 306. The data inputs 302 are random and depend upon other circuits and signals within the system. The control inputs 304 are random or specified, which means that they can depend upon other circuits and signals within the system, or they can be controlled to produce desired output signals. The clock activate signal 306 is used to enable or disable a clock signal. This clock signal would be a control input 304 of the latch macro 310. The latch macro 310 produces signal outputs 308 in response to the data inputs 302, the control inputs 304, and the clock activate signal 306.

Figure 4:
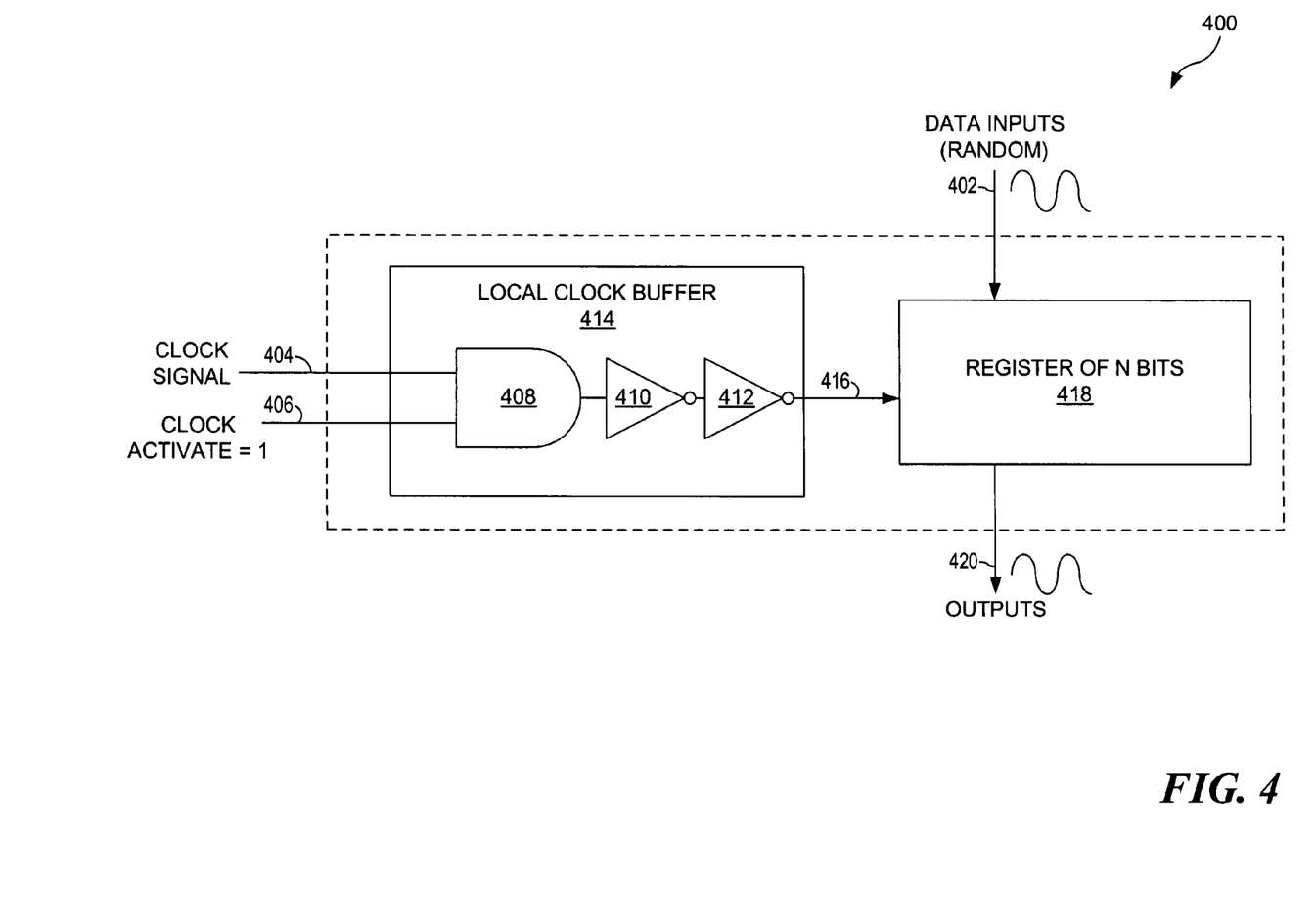
FIG. 4 is a block diagram illustrating a macro with clock gating off.

Referring to FIG. 4 of the drawings, reference numeral 400 generally designates a block diagram illustrating a macro with clock gating off. FIG. 4 is a more detailed illustration of FIG. 3 with the clock activate signal 406 being implemented to turn the clock gating off. The clock signal 404 and the clock activate signal 406 are inputs into the local clock buffer 414. The local clock buffer is made up of an AND gate 408 connected to two inverters 410 and 412. The output 416 of the local clock buffer 414 is an input to a register 418. The data inputs 402 are also received by the register 418. The register produces signal outputs 420 in response to the local clock buffer 414 and the data inputs 402. By setting the clock activate signal 406 to "1," the AND gate 408 is enabled and the output 416 is a time delayed version of the clock signal 404. Therefore, the signal outputs 420 are a wave-like transformation of the data inputs 402. When the clock activate signal 406 is set to "1" the clock gating is off.

Figure 5:
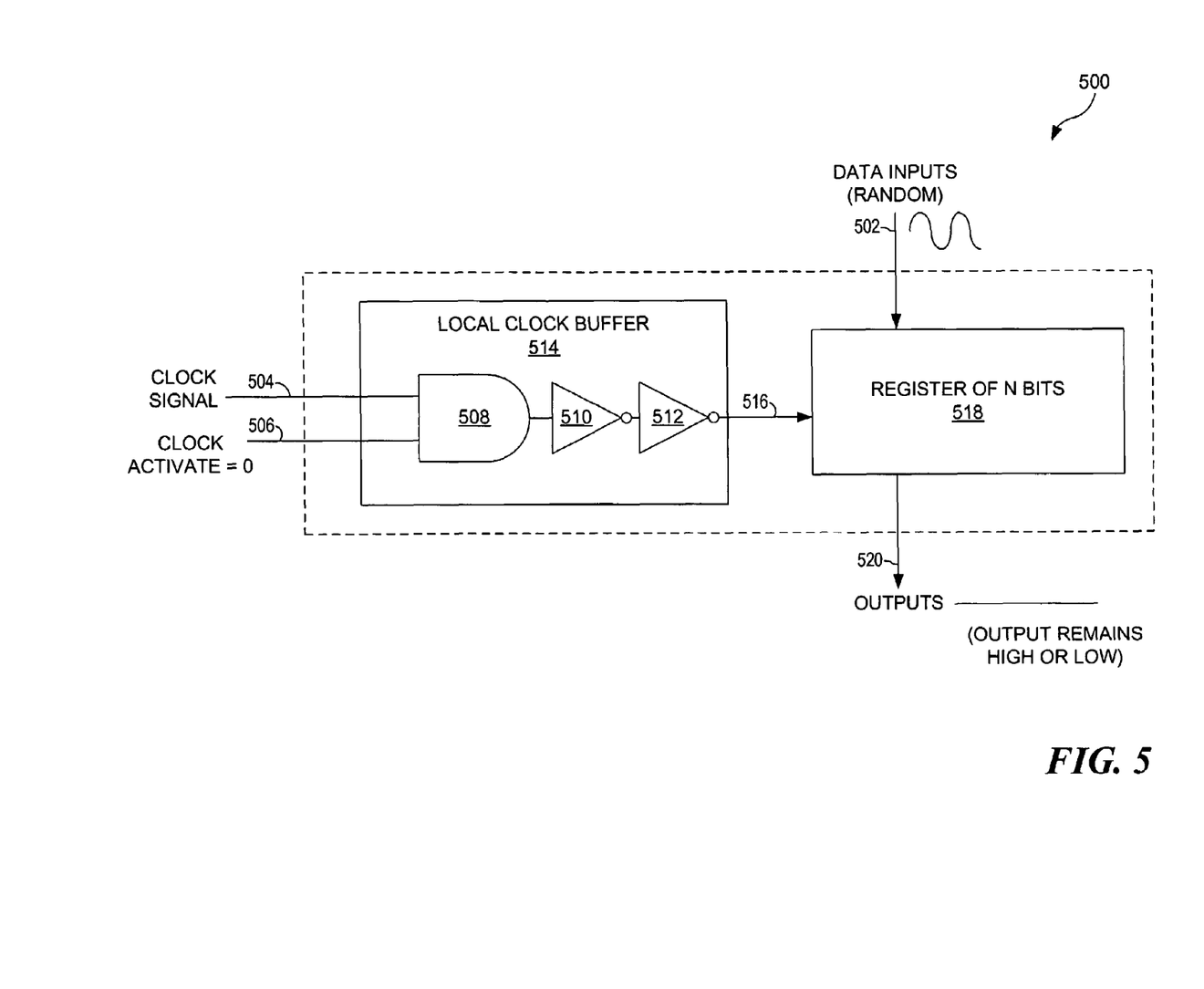

Referring to FIG. 5 of the drawings, reference numeral 500 generally designates a block diagram illustrating a macro with clock gating on. FIG. 5 is a more detailed illustration of FIG. 3 with the clock activate signal 506 being implemented to turn the clock gating on. The clock signal 504 and the clock activate signal 506 are inputs into the local clock buffer 514. The local clock buffer is made up of an AND gate 508 connected to two inverters 510 and 512. The output 516 of the local clock buffer 514 is an input to a register 518. The data inputs 502 are also received by the register 518. The register produces signal outputs 520 in response to the local clock buffer 514 and the data inputs 502. By setting the clock activate signal 506 to "0," the AND gate 508 is shut off and the output 516 remains high or low based upon the number of inverters in the local clock buffer 514. Therefore, the signal outputs 520 remain high or low due to the local clock buffer output 516. When the clock activate signal 506 is set to "0" the clock gating is on.

Figure 6:
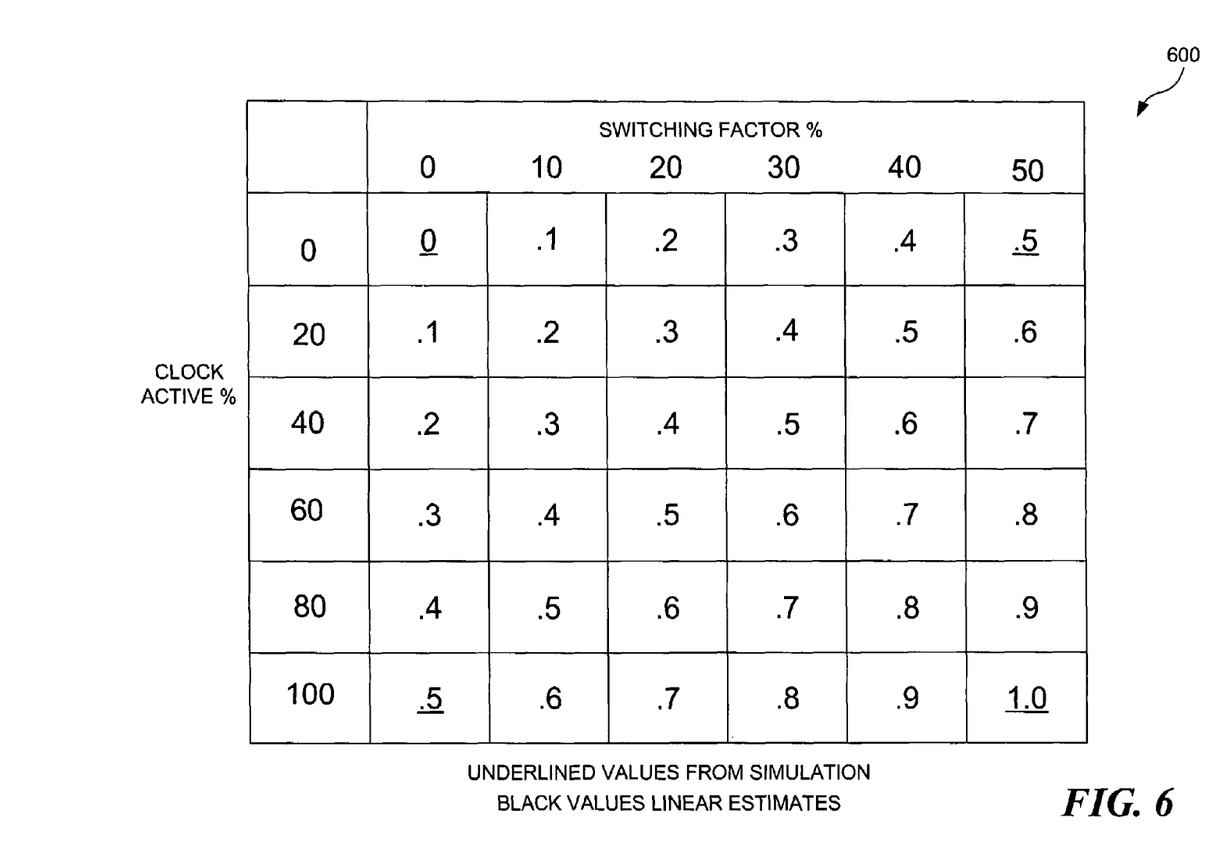
FIG. 6 is a hypothetical power table that estimates the power consumption of a macro based upon the input switching factor percentage and the clock activation percentage.

Referring to FIG. 6 of the drawings, reference numeral 600 generally designates a hypothetical power table that estimates the power consumption of a macro based upon the input switching factor percentage and the clock activation percentage. Computer programs, such as CPAM and ACES, are used to generate these power tables. Once again, only a few values are estimated through simulation and the rest of the table is generated in a linear fashion. In this table the two parameters that affect power consumption are input switching factor percentage and clock activation percentage. Clock activation percentage can be described as the percentage of time that clock gating is off in the macro. FIG. 4 provides an illustration of a macro with clock gating off. Accordingly, if clock gating is always off then the clock activation percentage would be 100%. If clock gating is always on then the clock activation percentage would be 0%. The clock activation percentage can also be used if there are two local clock buffers. For example, if one local clock buffer always has clock gating off and another local clock buffer always has clock gating on, then the clock activation percentage would be 50%. Furthermore, if both local clock buffers have clock gating off half of the time then the clock activation percentage is also 50%. This table provides accurate power estimates for a macro with an input switching factor between 0% and 50% and a clock activation between 0% and 100%.

This table is created by simulating the power estimates for the macro in four separate scenarios. For one embodiment, first the computer programs simulate the macro with a 0% switching factor and a 0% clock activation and load the power estimate into the table. Then, a simulation for a 50% switching factor and a 0% clock activation is accomplished and the power estimate is loaded into the table. Next, a simulation for a 0% switching factor and a 100% clock activation is carried out and the power estimate is loaded into the table. Lastly, the computer programs simulate the macro with a 50% switching factor and a 100% clock activation and load the power estimate into the table. After these four simulations are finished, the computer programs fill in the rest of the table in linear fashion.

The ability to produce these types of power tables is integral for VLSI design. By including clock activation percentage as a variable in these power tables the estimates are more accurate. If the power consumption of every macro within a chip can be accurately estimated, then the entire chip's power consumption can be accurately estimated. With accurate power estimates designers can try to reduce the power consumption of macros, chips, and even complete systems. Minimizing power consumption can increase battery life, reduce packaging costs, and reduce power delivery costs.

Figure 7:
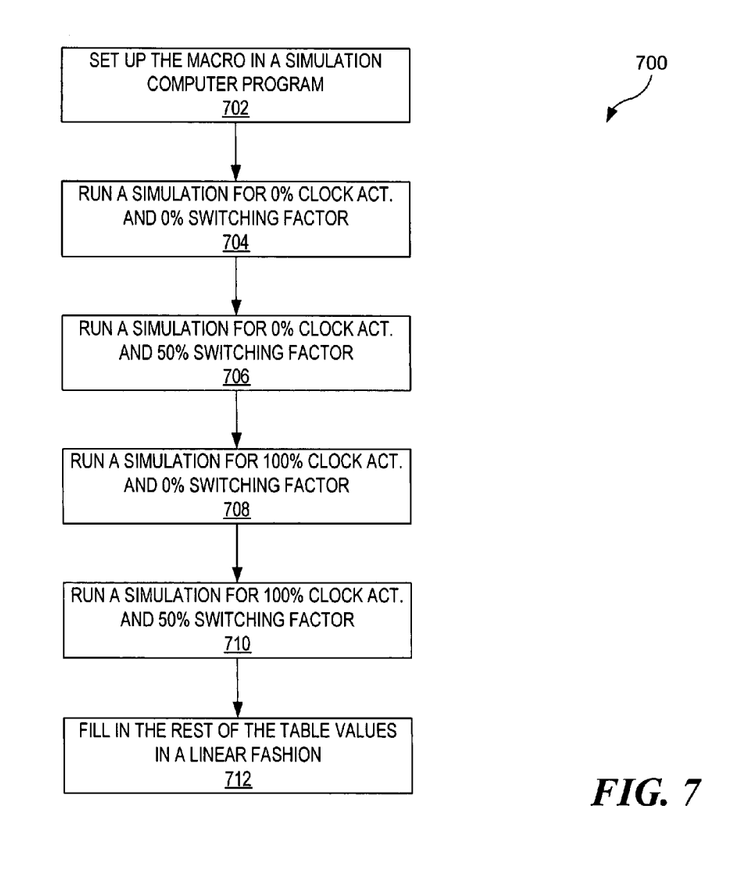
FIG. 7 is a flow chart depicting the method of producing an energy table for a macro based upon the input switching factor percentage and the clock activation percentage.

Referring to FIG. 7 of the drawings, reference numeral 700 generally designates a flow chart depicting the method of producing an energy table for a macro based upon the input switching factor percentage and the clock activation percentage. First, the macro must be set up in a simulation computer program in step 702. Then, four sets of simulations are generated in any order. For one embodiment, simulations are run for 0% clock activation and 0% switching factor in step 704; 0% clock activation and 50% switching factor in step 706; 100% clock activation and 0% switching factor in step 708; and 100% clock activation and 50% switching factor 710. After these simulations are finished, the rest of the power table is filled in a linear fashion in step 712. The final result is an accurate power table for a macro with a clock gating input.

It is understood that the present invention can take many forms and embodiments. Accordingly, several variations of the present design may be made without departing from the scope of the invention. The capabilities outlined herein allow for the possibility of a variety of programming models. This disclosure should not be read as preferring any particular programming model, but is instead directed to the underlying concepts on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for generating circuit energy models for a plurality of combinations of clock activate signals for a macro, wherein the macro uses clock gating inputs that comprise the clock activate signals, the method comprising:
generating a first macro energy table with the clock activate signals off;
generating a second macro energy table with the clock activate signals on;
generating a power consumption model for a circuit using at least one of the first macro energy table and the second macro energy table; and
wherein the power consumption model is configured for subsequent use in designing an electronic circuit.

2. The method as recited in claim 1, wherein the generating of one of the first macro energy table or the second macro energy table further comprises setting up a model macro that accurately represents a physical macro.

3. The method as recited in claim 2, wherein the generating of one of the first macro energy table or the second macro energy table further comprises producing power simulation values for at least one of a plurality of combinations of the clock activate signals by using the model macro.

4. The method as recited in claim 3, wherein the generating of one of the first macro energy table or the second macro energy table frther comprises loading the power simulation values into the corresponding macro energy table.

5. The method as recited in claim 4, wherein the generating of one of the first macro energy table or the second macro energy table further comprises linear extrapolation of intermediate values between the power simulation values of the corresponding energy table.

6. A computer program product for generating circuit energy models for a plurality of combinations of clock activate signals for a macro, wherein the macro uses clock gating inputs that comprise the clock activate signals, the computer program product having a tangible, computer-readable medium with a computer program embodied thereon, wherein the computer program comprises:
computer code for generating a first macro energy table with the clock activate signals off;
computer code for generating a second macro energy table with the clock activate signals on;
computer code for generating a power consumption model for a circuit using at least one of the first macro energy table and the second macro energy table; and
wherein the power consumption model is configured for subsequent use in designing an electronic circuit.

7. The computer program product as recited in claim 6, wherein the computer code for generating one of the first macro energy table or the second macro energy table further comprises setting up a model macro that accurately represents a physical macro.

8. The computer program product as recited in claim 7, wherein the computer code for generating one of the first macro energy table or the second macro energy table further comprises producing power simulation values for at least one of a plurality of combinations of the clock activate signals by using the model macro.

9. The computer program product as recited in claim 8, wherein the computer code for generating one of the first macro energy table or the second macro energy table further comprises loading the power simulation values into the corresponding macro energy table.

10. The computer program product as recited in claim 9, wherein the computer code for generating one of the first macro energy table or the second macro energy table further comprises linear extrapolation of intermediate values between the power simulation values of the corresponding energy table.

11. An apparatus for generating circuit energy models for a plurality of combinations of clock activate signals for a macro, wherein the macro uses multiple clock gating inputs that comprise the clock activate signals, the apparatus comprising:
means for setting up a model macro that accurately represents a physical macro;
means for producing power simulations for at least one of a plurality of combinations of the clock activate signals by using the model macro;
means for generating macro energy tables by using the power simulation values; and
means for generating a power consumption model for a circuit using one of the first macro energy table and the second macro energy table; and
wherein the power consumption model is configured for subsequent use in designing an electronic circuit.

12. The apparatus as recited in claim 11, wherein the means for generating macro energy tables by using the power simulation values further comprises a means for loading the simulation values into an energy table and a means for linear extrapolation of intermediate values between the power simulation values.

* * * * *